Aug. 28, 1928.
W. A. LUDEKE
1,682,389
WEATHER STRIP
Original Filed April 14, 1926
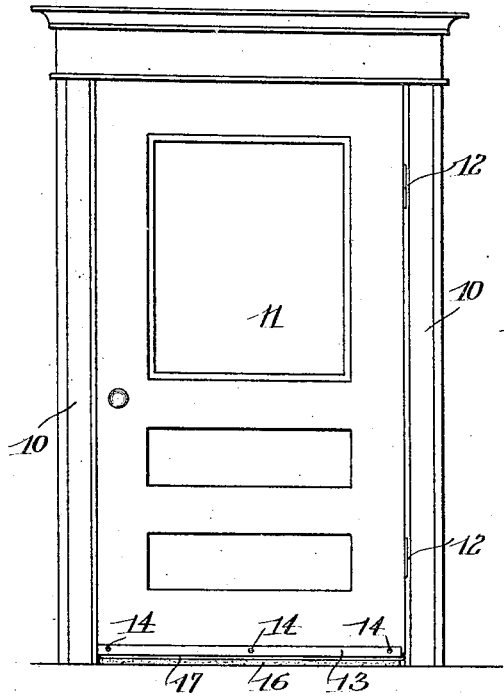
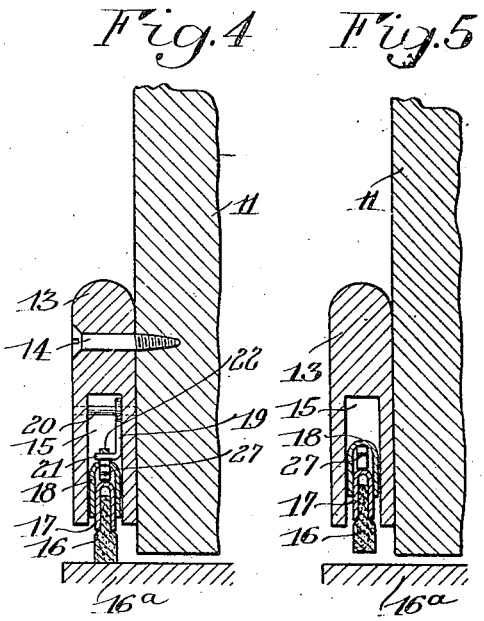
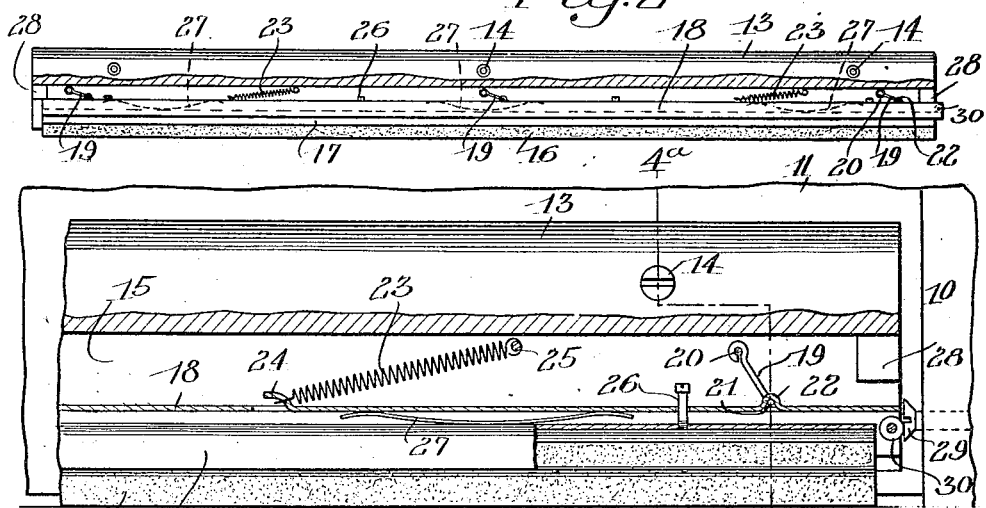
INVENTOR
William A. Ludeke
BY
Cumpston & Griffith
his ATTORNEYS Patented Aug. 28, 1928.

1,682,389

UNITED STATES PATENT OFFICE.

WILLIAM A. LUDEKE, OF ROCHESTER, NEW YORK.

WEATHER STRIP.

Application filed April 14, 1926, Serial No. 102,080. Renewed July 11, 1928.

The present invention relates to weather strips and has for its object to provide an improved self-adjusting weather strip embodying a simple form of contruction which is both economical to manufacture and efficient in operation.

A further object of the invention is to provide an improved weather strip which can be easily applied to and removed from the face of a door or other closure without disfiguring the latter.

A still further object of the invention is to provide a weather strip for attachment to a door or closure which includes a relatively thin moulding or casing for housing and concealing the suspended parts by which the flexible floor engaging member is supported, said parts being designed to have a minimum thickness, so that the thickness of the moulding may be reduced to a minimum, whereby it will project but slightly from the door so as not to detract from its appearance or interfere with its full opening.

To these and other ends the invention resides in certain improvements and combinations of parts, all as will be hereinafter more fully described, the novel features being pointed out in the claims at the end of the specification.

In the drawings:—

Figure 1 is a view in elevation of a door and its frame to which the invention is shown applied;

Figure 2 is a part sectional elevation taken longitudinally of the weather strip casing shown detached from the door;

Figure 3 is an enlarged fragmentary elevation partly in section illustrating the operating parts which support and move the weather strip to and from service position;

Figure 4 is an enlarged transverse section taken on line 4ª—4ª of Figure 3 showing the weather strip in service position; and Figure 5 is a similar section with the strip shown in the elevated position to which it is automatically moved when the door is opened.

Similar reference numerals throughout the several views indicate the same parts.

In the drawings illustrating the present embodiment of the invention, I have shown the usual door frame 10 and door 11 hinged thereto at 12 as shown in Figure 1. Heretofore in doors to which self-adjusting weather strips have been applied, it has been the practice, generally speaking, to groove or channel the bottom of the door to receive the parts which support the weather strip proper. This is objectionable since it adds to the cost of application of the parts and weakens the door and renders the parts inaccessible, making it necessary to remove the door from its hinges before repairs can be made. To overcome these objections, I have provided a holder 13 for the weather strip which is in the form of a relatively thin moulding or casing which can be readily attached to and removed from the door as by the use of screws 14. The moulding, which may be constructed of wood or relatively thin sheet metal has a longitudinally extending recess 15 therein for housing the several parts which support the weather strip proper, the latter being indicated at 16 and formed of any suitable material such as felt or any other flexible material which will readily accommodate itself to the floor whereby to tightly close the space between the bottom of the door and the threshold 16ª therebeneath. The flexible strip 16 is suitably connected with a metal strip 17 preferably in the form of a channel constructed of relatively thin sheet metal in which the flexible strip is secured. The channel 17 is connected with a support 18 which is also preferably in the form of a channel constructed of relatively thin sheet metal and in which the channel 17 is mounted and yieldably supported by means which will subsequently be described. The upper support or channel 18 is swingingly mounted within the recess 15 of the moulding, being supported therein by a series of hangers or links, depending from suitable pivot members, such as the pins 20 traversing the longitudinal recess 15 of the moulding as shown in Figure 4. The lower ends of the links may be connected with the channel 18 in any desired manner, but are preferably provided with outwardly turned angular portions 21 overlying the channel 18 and extending beneath the lugs 22 struck upwardly from the latter as shown in Figures 3 and 4.

When the door is closed both channels are depressed by means which will be presently described whereby the flexible strip 16 is forced into engagement with the floor thus forming a weather tight joint for preventing the passage of air or rain beneath the door. Upon opening the door the channels 17 and 18 and the flexible strip supported thereby are automatically raised to the position shown in Figure 5 by a plurality of springs 23 having their lower ends connected with lugs 24 struck upwardly from the channel 18 and their upper ends connected with studs 25 suitably secured upon the casing 13 and projecting into the recess 15 thereof as shown in Figure 3.

The lower channel 17 is slidably supported within the upper channel and is limited in its outward movement by a plurality of pins or bolts 26 extending through the upper channel and suitably connected with the lower channel preferably as indicated in Figure 3. The heads of the bolts rest upon the upper channel as shown in Figure 2 when the door is opened, the lower channel then being depressed by the springs 27 interposed between it and the upper channel as shown in Figures 3 and 5, in which position the flexible strip is raised out of contact with the floor.

Stops 28 are disposed within the recess 15 of the casing 13 for limiting the upward movement of the channel 18 when the door is opened, said channel being automatically raised into engagement with the stops at this time by the action of the springs 23.

Means is provided for automatically depressing or lowering the channel 18 upon closing the door whereby the flexible strip 16 is urged into engagement with the floor or threshold 16ª, as indicated in Figure 4. This means preferably comprises an operating member 29 projecting inwardly from the right hand door jamb or frame 10 as viewed in Figure 1 and disposed within the path of a roller 30 secured upon or within the channel 18 and projecting slightly therefrom so that it will engage the operating member when the door approaches closing position. The lower channel 17 is made to stop short of the end of the upper channel so as to clear the roller as indicated in Figure 3. The operating member 29 is preferably in the form of a screw which can be readily adjusted after the weather strip has been applied to the door whereby to regulate the throw or outward swinging movement of the channels and consequently the pressure required to hold the flexible strip in contact with the threshold 16ª. The operating member may be considered as a part of the door frame or it may be omitted and the channel 18 extended so that the roller will come in direct contact with the frame upon closing the door. In either case said channel will be moved both downwardly and longitudinally of the casing 13, thereby moving in two directions when shifted to operative position.

In the operation of the device, assuming that the door has been opened, the parts will occupy the position shown in Figure 5, the upper channel being held in this position by the springs 23 and limited in its upward movement by the stops 28. The lower channel at this time is depressed by the springs 27 so that the heads of the bolts 26 will engage the top of the channel 18 as shown in Figure 2. However, with the parts in this position the strip 16 will still be sufficiently elevated to permit the door to freely swing upon its hinges, since the strip 16 does not come in contact with the threshold until the door is moved to the position at which the operating member 29 engages the roller 30 to swing the channel 18 downwardly and longitudinally to the left as viewed in Figure 1. As the door moves to latching or final closing position the springs 27 will yield sufficiently to allow the strip to accommodate itself to the threshold during which time the lower channel 17 will ride upwardly within the channel 18 against the resistance of said springs. When the door is opened and the roller moved out of contact with the screw 29, the springs 23 will move the channel 18 longitudinally within the casing 13, the links 19 causing it to swing upwardly from the position shown in Figure 3 to that shown in Figure 2, whereby the flexible strip is immediately raised sufficiently to overcome the downward thrust afforded by the action of the springs 27, it being understood that the vertical movement of the channel 17 is less than that of the channel 18.

By telescoping the channels 17 and 18 as shown and causing one to move relative to the other, as described, I provide a simple and ecconomical form of self-adjusting weather strip concealed within a relatively thin casing or moulding which can be easily applied to and removed from the face of a door or other closure where it is desired to effectively prevent the passage of air or the driving of rain beneath the bottom of the closure. The telescoping of the channels within the moulding effects economy in space and permits a relatively thin strip of moulding to be used, thus economizing in the use of material and providing a weather strip which does not detract from the appearance of the door or the closure to which it is applied. The channels for supporting the flexible strip move to and from service position in a vertical plane substantially parallel to the face of the door without at any time shifting from said plane whereby said parts may be enclosed in a relatively thin casing which projects but slightly from the face of the door.

I claim as my invention:—

1. A weather strip adapted for attachment to a door or closure comprising a holder, a channel swingingly mounted upon the holder and adapted when pressure is applied thereto in a predetermined direction to swing upon the holder, retracting means for the channel, a member yieldably supported within said channel and a flexible strip carried by said member.

2. A weather strip adapted for attachment to a door or closure comprising a holder, a channel swingingly mounted upon the holder and adapted when pressure is applied thereto in a predetermined direction to swing upon the holder, retracting means for the channel, a second channel yieldably supported within said first mentioned channel and a flexible strip carried by said second mentioned channel.

3. A weather strip adapted for attachment to a door or closure comprising a casing, hangers pivoted within the casing, a channel supported by the hangers within the casing, spring means for holding the channel elevated within the casing, said channel being adapted when pressure is applied thereto in a predetermined direction to swing outwardly against the resistance of said spring means, a second channel yieldably supported within the first mentioned channel and a flexible strip carried by said second mentioned channel.

4. A weather strip adapted for attachment to a door or closure comprising a casing, hangers pivoted within the casing, a channel within the casing pivotally connected with the hangers, a stop within the casing for limiting the movement of the channel in one direction, spring means tending to urge the channel in engagement with said stop, said channel being adapted when pressure is applied thereto in a predetermined direction to swing away from the stop, a second channel guided within the first mentioned channel, means tending to urge it therefrom, means for limiting its outward movement and a flexible strip carried by the second mentioned channel.

5. In combination, a frame and a door adapted to swing thereon, a holder secured to one side of the door, a channel swingingly mounted upon the holder and adapted upon closing the door to engage the frame and to be swung downwardly thereby, means for retracting the channel when the door is opened, a member yieldably supported within said channel and a flexible strip carried by said member.

6. In combination, a frame and a door adapted to swing thereon, a holder secured to one side of the door, a channel swingingly mounted upon the holder and adapted upon closing the door to engage the frame and to be swung downwardly thereby, means for retracting the channel when the door is opened, a second channel yieldably supported within the first, means for limiting its outward movement and a flexible strip projecting from and supported by the second mentioned channel.

7. The combination with a door and its frame, of a channel swingingly mounted upon one side of the door and adapted upon closing the latter to be moved by the frame simultaneously in two directions, a second channel yieldably supported within the first, a flexible strip carried by the second mentioned channel and means for retracting the first mentioned channel when the door is opened.

8. The combination with a door and its frame, of a flexible strip, a holder therefor, a support upon which the holder is yieldably mounted, links connected with the door and with the support to permit the latter to swing relative to the door in a plane substantially parallel thereto, operating means for the support located upon the frame and adapted upon closing the door to actuate the support, whereby to move the strip to service position and spring means for retracting the support when the door is opened.

9. The combination with a door and its frame, of a channel swingingly connected with the door, a flexible strip, yieldable supporting means for the strip located within said channel, means upon the frame for moving the channel downwardly upon closing the door whereby to move the strip to service position and means for retracting the channel when the door is opened.

10. The combination with a door and its frame, of a channel swingingly connected with the door, a second channel yieldably mounted within the first, a flexible strip carried by the second channel, means associated with the frame arranged to swing the first mentioned channel downwardly upon closing the door whereby to move the strip to service position and means for retracting said first mentioned channel when the door is opened.

11. The combination with a door and its frame, of a recessed moulding secured to one side of the door, a channel swingingly mounted within the moulding and adapted to be engaged by the frame when the door is closed whereby it is swung downwardly within the moulding, a second channel yieldably mounted within the first, a flexible strip carried by the second mentioned channel and means for retracting the first mentioned channel when the door is opened.

12. A device of the class described adapted for attachment to a door or closure comprising a holder, a support guided for vertical movement upon the holder and adapted when pressure is applied thereto in one direction to move downwardly upon the holder, retracting means for the support, a weather strip guided for vertical movement upon the support and means tending to urge the strip downwardly upon the support.

13. In combination, a door having a recess adjacent its bottom edge, a channel-shaped support mounted to swing in said recess and adapted when pressure is applied thereto in a direction longitudinally thereof to move downwardly within the recess, retracting means for the support, a weather strip guided for vertical movement within the said support and spring means between the support and weather strip tending to urge the latter downwardly within said recess.

WILLIAM A. LUDEKE.